United States Patent [19]

Velie

[11] Patent Number: 5,203,365

[45] Date of Patent: Apr. 20, 1993

[54] EXCESS FLOW CHECK VALVE CAPSULE

[75] Inventor: Wallace W. Velie, Alta Loma, Calif.

[73] Assignee: Mallard Products, Inc., Rancho Cucamonga, Calif.

[21] Appl. No.: 958,092

[22] Filed: Oct. 8, 1992

[51] Int. Cl.⁵ ............................................. F16K 17/28
[52] U.S. Cl. .............................. 137/454.2; 137/513.5; 137/517; 251/65
[58] Field of Search ................... 137/517, 454.2, 513.5; 251/65

[56] References Cited

U.S. PATENT DOCUMENTS

| | | | |
|---|---|---|---|
| 2,569,316 | 9/1951 | Jerman. | |
| 2,949,931 | 8/1960 | Ruppright | 251/65 X |
| 4,874,012 | 10/1989 | Velie | 251/65 |
| 4,993,451 | 2/1991 | Kremer | 137/454.2 |
| 5,010,916 | 4/1991 | Albrecht | 137/454.2 |

Primary Examiner—Stephen M. Hepperle
Attorney, Agent, or Firm—Jacobson, Price, Holman & Stern

[57] ABSTRACT

A magnetically operated excess flow check valve which permits fluid flow through a line when the flow is below a predetermined flow rate but shuts the flow if the flow rate rises above the predetermined limit to prevent uncontrolled flow or discharge of fluids such as might occur if a fluid line is ruptured including unique packaging or mounting of the excess flow check valve in a capsule to facilitate its installation in various flow lines, fittings, pipe systems, appliances and the like. The packaging is in the form of a self contained capsule which can be inserted in various flow passageways with the capsule facilitating assembly of the individual components into a self contained compact package.

17 Claims, 1 Drawing Sheet

EXCESS FLOW CHECK VALVE CAPSULE

BACKGROUND OF THE INVENTION

1. Field of the Invention

The present invention generally relates to an excess flow check valve which permits fluid flow through a flow line when the flow is below a predetermined flow rate but closes the flow line if the flow rate rises above the predetermined limit to prevent uncontrolled flow or discharge of fluids such as might occur if a fluid line is ruptured. More specifically, the present invention relates to the packaging or mounting of an excess flow check valve in a capsule to facilitate its installation in various flow lines, fittings, pipe systems, appliances and the like. The excess flow valve is magnetically operated in response to a low differential pressure with the packaging being in the form of a self contained capsule which can be inserted in various flow passageways including a valve body, a connector fitting, a hose fitting, a pipe nipple, a tube, an appliance and other similar installations to provide excess flow protection. The capsule facilitates assembly of the individual components into a self contained compact package, provides for easy insertion of the capsule into a fitting or tube, provides means for substantially restricting flow, provides means for allowing small leakage flow for automatic valve resetting, precisely positions and retains the components of the valve for proper operation, provides a unique structure for coupling the two capsule components, permits flow testing as a capsule to verify performance and provides a compact configuration to minimize the size, diameter and length required to accommodate the capsule.

2. Description of the Prior Art

Prior Pat. No. 2,569,316 issued Sep. 25, 1951 to Jerman discloses a differential pressure check valve which prevents excess flow which uses magnetic attraction to retain the valve member in "open" position. My prior Pat. No. 4,874,012 issued Oct. 17, 1989 discloses a magnetically operated excess flow valve for low differential pressure application such as for natural gas appliances. As illustrated in the above mentioned prior patents, the components of the flow valve are necessarily assembled when being installed at a site of use. The necessity of assembling the components with respect to a pipe fitting or other flow line is quite time consuming, requires considerable manual dexterity and introduces the possibility of erroneous or malfunctioning installations. The prior art does not disclose the concept of packaging the components of a low differential pressure magnetically operated excess flow valve in a capsule to facilitate its installation at a site of use.

SUMMARY OF THE INVENTION

An object of the present invention is to provide a magnetically operated excess flow valve which is operative in response to low differential pressure in which the components are packaged in a self contained capsule to facilitate it being inserted into a flow passageway such as a valve body, connector fitting, hose fitting, pipe nipple, tube, appliance and the like thereby greatly reducing the time required to install the valve and assuring that the valve will be properly located and function properly to prevent flow of fluid above a predetermined flow rate and pressure differential.

Another object of the invention is to provide an excess flow check valve capsule in accordance with the preceding object in which the capsule is constructed of two halves which are retained together by a unique mean to retain the halves together for shipment and handling enabling the capsule to be forcefully inserted into and retained in a duct fitting or the like, restricting external flow leakage, facilitating the capsule being sealed within the fitting to prevent flow leakage between the capsule body and the fitting with the halves being precisely indexed axially and radially.

A further object of the invention is to provide a check valve capsule in accordance with the preceding objects constructed to facilitate assembly of the individual components into a self contained compact package, provide for easy insertion of the capsule into a fitting, tube, or other flow line, provide a means for substantially restricting flow, provide a means for allowing small leakage flow for automatic valve resetting, precisely positioning and retaining the components for accurate relative movement for proper operation, permit flow testing as a capsule to verify performance and provide a compact configuration to minimize the size, diameter and length required to accommodate the capsule.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
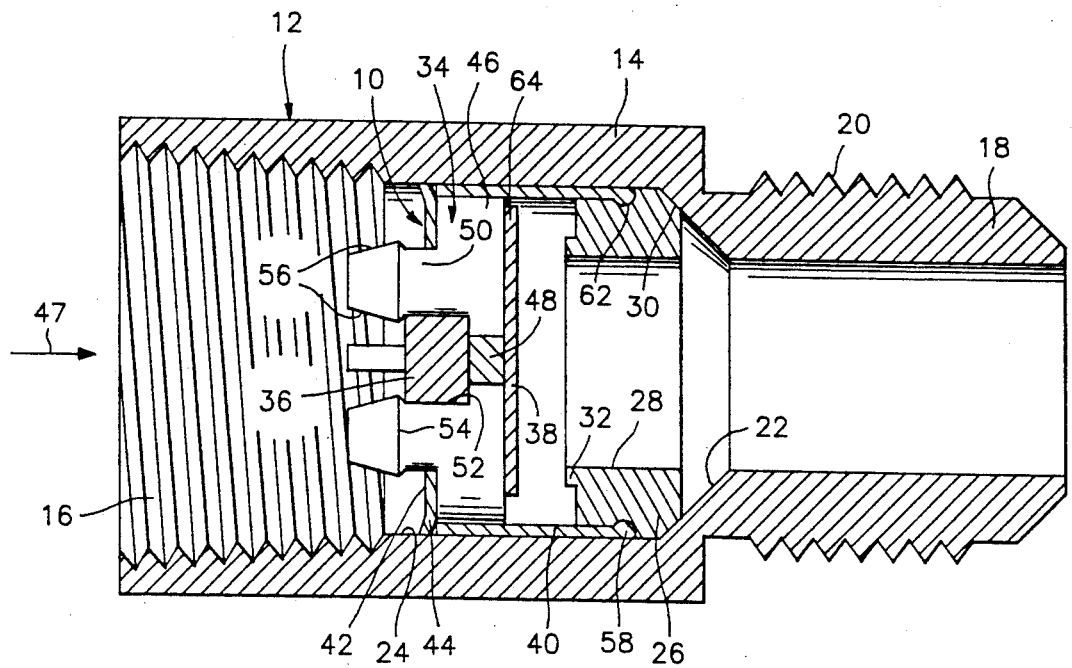
FIG. 1 is a vertical sectional view of the magnetically operated excess flow check valve capsule of the present invention installed in a typical pipe fitting or connector illustrating the relationship of the components when the valve is in "open" position.

Referring now specifically to the drawings, the low pressure differential magnetically operating excess flow check valve capsule is generally designated by reference numeral 10 and is illustrated in a typical installation in FIG. 1 within the interior of a pipe fitting or nipple generally designated by reference numeral 12 which includes a cylindrical body 14 having one end thereof internally threaded at 16 and the other end being reduced at 18 and externally threaded as indicated by reference numeral 20. The fitting 12 may be a pipe fitting, connector, tube, nipple, appliance or any other flow line in which fluid flows and in which it is desired to permit fluid flow up to and including a predetermined flow rate and pressure differential and when this flow rate and pressure differential is exceeded, the check valve will move from an "open" position as illustrated in FIG. 1 to a "closed" position. The transition from the cylindrical member 14 to the reduced portion 18 defines an inwardly inclined shoulder 22 with it being pointed out that the shoulder may take various configurations to form a stop or abutment for one end of the check valve capsule 10. The internal threads 16 are terminated in spaced relation to the shoulder 22 to define an internal cylindrical area 24 to receive the capsule 10.

The excess flow check valve capsule includes four basic components including a generally cylindrical valve seat body 2 having a centrally disposed flow passageway or orifice 28. The downstream end of the valve seat body 26 is inclined or tapered at 30 corresponding to and sealingly engaging the surface of the shoulder 22 so that when the capsule 10 is inserted into the fitting 12, the valve seat body 26 will engage and thus be limited as to its insertion point. The upstream side of the valve seat body 26 includes an annular projection or flange 32 forming a valve seat and having an inner surface coinciding with the orifice 28 and an outer peripheral surface spaced radially inwardly from the peripheral surface of the valve seat body 26 as illustrated in FIG. 1. A magnet retainer body 34 is spaced axially from the valve seat body 26 with the magnet retainer body 34 supporting and retaining a permanent magnet 36 centrally therein toward the upstream end of the check valve capsule 10. A valve member or plate 38 constructed to be attracted by the magnet 36 is held against the downstream end of the magnet retainer body 34 by the magnet 36 with the periphery of the plate 38 being spaced inwardly from a cylindrical skirt 40 rigid with and forming a part of the magnet retainer body 34. An annular retaining ring 42 engages the upstream end of the magnet retainer body 34 and includes radially projecting tongues or tabs 44 which engage the interior surface 24 of the cylindrical member 14 as illustrated in FIG. 1 to retain the capsule 10 positioned within the fitting or duct 12.

In operation, fluid flow in the direction of the arrow 47 in FIG. 1 passes through the valve capsule 10 from left to right with fluid passing through the magnet retainer body and peripherally around the periphery of the plate 38 which is held in open position by the magnet 36. When fluid drag force on plate 38 due to a flow rate or pressure differential above a predetermined limit overcomes the restraining force of the permanent magnet 36, the valve plate 38 releases or decouples from the magnet 36 and moves downstream into engagement with the sealing surface of the valve seat 32 o the valve seat body 26 thus shutting off flow through the flow orifice 28. The magnet 36 will recover the valve plate 38 and move it from its "closed" position against the valve seat 32 back into engagement with the magnet retainer body 34 after the pressure differential between the upstream and downstream side of the check valve capsule is relieved. This general operation of the valve is similar to that in prior magnetically operated excess flow valves with the present invention being directed primarily to the packaging or capsule structure of the components of the valve.

The magnet retainer body 34 includes four radially extending arms 46 which have their outer ends integral with the skirt 40 and which intersect at the center as indicated by reference numeral 48 which forms a gap between magnet 36 and valve plate 38. Each of the arms 46 include an axial projection 50 extending upstream from the capsule 10 and define a recess 52 to receive and support the magnet 36. As illustrated in FIG. 1, each of the projections 50 includes a shoulder 54 in spaced relation to the upstream end thereof with the radially inner and outer edges of the projection 50 upstream of the shoulder 54 being tapered or inclined as indicated by reference numeral 56 with the outer edge inclining inwardly and the inner edge inclining outwardly from the shoulder 54 to the upstream end of the projection 50. The four radially facing inner surfaces 56 and shoulder 54 form a guide flare for inserting and retention of the magnet 36. The outer inclined surfaces form a guide flare for the interior surface of the retaining ring 42 thus enabling the magnet to be assembled into the magnet retainer body 34 and the retaining ring 42 assembled with respect to the magnet retainer body 34 prior to insertion into the fitting 12. The arms or webs 46 extend inwardly to engage the downstream side of the magnet and intersect at 48 as illustrated in FIG. 1. While four webs or arms are illustrated, the number of the arms or webs may vary with the axial thickness of the arms or webs 46 forming a gap between the magnet 36 and the valve plate 38 with the gap being necessary to control the magnetic retaining force on plate 38 exerted by the magnet 36. The external tapered surfaces 56 on the projections 50 on the webs or arms 46 together with the shoulder or ridge 54 accommodates assembly of the retaining ring 42 which is used to hold the capsule into the duct or fitting 12 by the tabs 44 flexibly and resiliently engaging the internal surface 24 of the fitting 12. The skirt 40 extends peripherally of the magnet retainer body 34 and extends in the downstream direction in telescopic relation to a portion of the valve seat body 26 and includes a peripheral ridge or bead 58 generally circular in cross section which is used to index and secure the magnet retainer body 34 to valve seat body 26 and provides a sealing engagement between the capsule 10 and the interior surface 24 of the duct or fitting 12.

Figure 2:
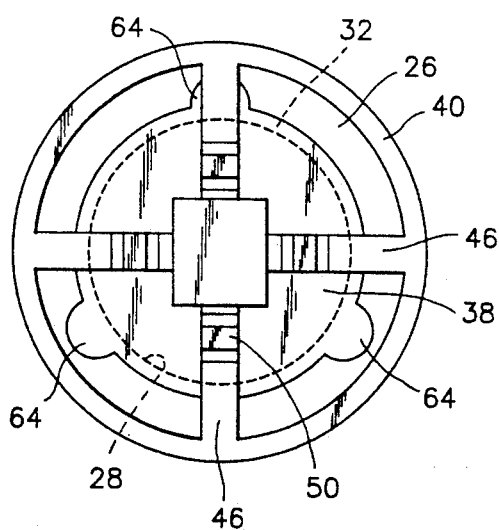
FIG. 2 is an end elevational view from the upstream side of the valve.
Figure 3:
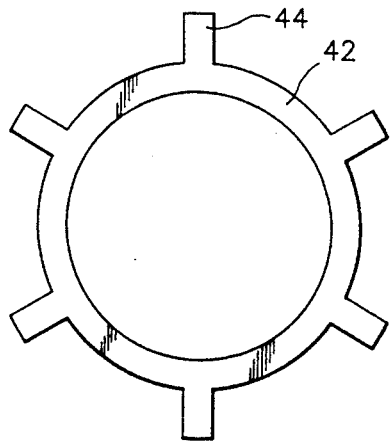
FIG. 3 is a plan view of the retaining ring for retaining the upstream end of the check valve in relation to the interior of the fitting in which the check valve is installed.
Figure 4:
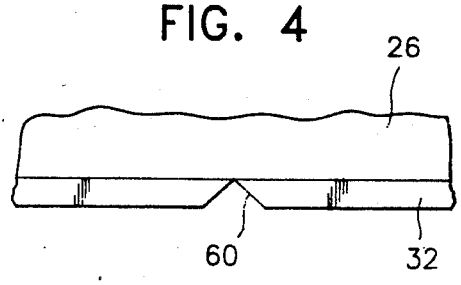
FIG. 4 is an enlarged edge view of a portion of the valve seat.
Figure 5:
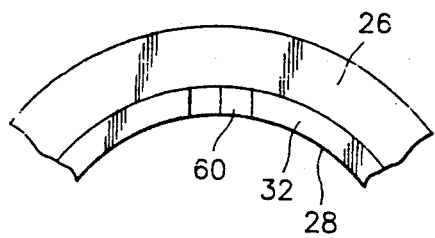
FIG. 5 is an elevational view of the segment of the valve seat illustrated in FIG. 4.

The valve seat body 26 which contains the flow orifice 28 also includes the valve seat 32 in the form of a sealing surface upon which the valve plate 38 rests when it moves to the "closed" position or when it is in its downstream position to provide a flow seal. The valve plate 38 and the valve seat or sealing surface 32 are substantially flat and smooth. However, in order to provide some bypass flow leakage for resetting of the valve by pressure release when the cause of activation is corrected, the valve seat or sealing surface 32 contains at least one V shaped notch 60 therein with the valve seat 32 having a sufficient projection from the valve seat body 26 to accommodate the depth of notch 60 as illustrated in FIG. 4. The valve seat body 26 also includes a peripheral groove 62 to receive the bead or ridge 58 on the skirt 40 and the tapered or inclined edge 30 facilitates assembly of the capsule into the interior surface 24 of the duct or fitting 12 and engages the surface 22 on the duct or fitting 12 to positively position the capsule within the duct or fitting 12. The valve plate 38 includes a plurality of radially extending, peripherally spaced projecting tabs or knob like structures 64, as illustrated in FIG. 2, which radially position the valve plate 38 within the interior of the skirt 40 to maintain the flat central area of the plate 38 in alignment with the magnet 36 and in alignment with the valve seat 32. The projecting tabs 64 retain the valve plate centrally disposed within the skirt 40 in order that it will engage the notched but otherwise flat surface of the valve seat 3 when in its "closed" position and engage the downstream end of the magnet retainer body 34 when in its "open" position with the circumferential spacing of the tabs 64 providing a flow passage around the periphery of the plate 38 when the valve plate 38 is in "open" position. As illustrated in FIG. 2, the outer edges of the tabs 64 are spaced slightly from the interior of the skirt 40 to further provide a flow passage and to enable some lateral movement of the valve plate 38 to enable it to move freely from its position against the magnet retainer body 34 to its position against the valve seat 32.

The components of the capsule 10 may be constructed of the same or similar materials or constructed of diverse materials. The valve seat body 26 may be constructed of a plastic material which has some degree of resiliency and memory to facilitate its insertion and to facilitate sealing engagement with the fitting or duct and facilitate its sealing engagement with the valve plate 38. The magnet retainer body may be constructed of material that is relatively harder than the valve seat body 26 for structural integrity and to securely mount the magnet 36 and enable assembly of the retaining ring 42. The magnet retainer body 34 may be of a harder plastic material or metal and the skirt 40 may be a one piece construction with the magnet retainer body 34 or these components may be separate but fixedly interconnected by any suitable means. The valve plate 38 is flat and constructed of material or in a manner that it will be magnetically attracted by the magnet 36. The configuration of the magnet may be square, circular or any other desired configuration and the magnetic force characteristics of the magnet 36 are such as to provide appropriate magnetic attraction force to the plate 38 to maintain the valve plate 38 against the magnet retainer body 34 with a predetermined force based on the magnetic force of the magnet 36 and the gap provided by the intersecting portions 48 of the arms or webs 46.

The above described magnetically operated excess flow valve capsule 10 provides a package to precisely position the four components of the valve and also facilitates assembly of those individual pieces and provides for easy insertion into a fitting or duct 12. The retaining ring 42 is added to the capsule to capture the capsule 10 within the interior surface 24 of the duct or fitting 12 when the capsule is installed therein with the retaining ring 42 being securely held in place by the projections 50 on the arms or webs 46 and by engagement of the tabs 44 with the interior surface 24 of the duct or fitting 12. Since the capsule is self contained and assembled externally of the duct or fitting, it can be flow tested independent of the duct or fitting 12 in which it will be used. As indicated, the valve seat body 26 and the magnet retainer body 34 can be constructed of different materials selected for optimization of sealing, structural integrity and ease of component assembly with the magnet retainer body 34 normally being of harder material than the valve seat body 26 in order to achieve these objectives.

The foregoing is considered as illustrative only of the principles of the invention. Further, since numerous modifications and changes will readily occur to those skilled in the art, it is not desired to limit the invention to the exact constructions and operation shown and described, and, accordingly, all suitable modifications and equivalents may be resorted to, falling within the scope of the invention.

I claim:

1. A self contained magnetically operated flow valve capsule for insertion into a flow duct comprising a permanent magnet retaining body means, a valve seat body means spaced from said retaining body means, a permanent magnet means mounted in said retaining body means, a valve plate means moveable between said retaining body means and said valve seat body means to control flow through said flow duct, said magnet retaining body means including webs for retaining and centrally positioning the magnet means, a retaining ring means mounted on said webs to retain the capsule in the flow duct, and means on said retaining body means for engaging, indexing, positioning and sealing the retaining body means with respect to the seat body means and accommodating the plate means.

2. The capsule of claim 1 wherein the retaining body means precisely forms a magnetic gap between the magnet means and the plate means and precisely positions the plate means with respect to the magnet means.

3. The capsule of claim 1 wherein the permanent magnet means is generally positioned centrally in said retaining body means.

4. The capsule of claim 1 wherein the plate means includes means for radially positioning the plate means within said retaining body means.

5. The capsule of claim 1 wherein said means on said retaining body means engaging said seat body means includes an axial skirt on the retaining body means, said skirt including a peripheral rib at its downstream end to engage the valve seat body means, assist with flow sealing the seat body means and retaining body means, and to facilitate flow sealing the capsule within the flow duct.

6. The capsule of claim 1 wherein opposite webs on the magnet retaining body means have flared means to facilitate insertion of the magnet means and shoulders to retain the magnet means in its installed position.

7. The capsule of claim 1 wherein the valve seat body means contains a centrally located flow passage and an upstream flat surface forming a valve seat for engagement by the valve plate means for flow sealing.

8. The capsule of claim 6 wherein the webs include projections extending upstream of the magnet means, said projections having flared entrances to facilitate insertion of said retaining ring means and shoulders to retain the retaining ring means in its installed position.

9. The capsule of claim 7 wherein the upstream flat surface is slightly raised and provided with a transverse groove to permit bypass flow after the valve plate means is seated on the flat surface.

10. The capsule of claim 5 wherein the valve seat body means includes an annular groove in the exterior surface to facilitate engagement with the retaining body means skirt.

11. The capsule of claim 1 wherein the seat body means is of resilient material to facilitate sealing and the retaining body means is of a relatively harder material for structural integrity.

12. A magnetically operated excess flow valve capsule for installation in a flow passage having an inner peripheral surface defining a flow path, said capsule comprising a valve seat body mounted in the flow path in sealed relation thereto, said valve seat body including a flow passageway therethrough and a valve seat on an upstream end of the valve seat body with the valve seat extending peripherally of said flow passageway, a magnet retainer body mounted in the flow path in sealed relation thereto, means interconnecting said magnet retainer body and said valve seat body to maintain said bodies in fixed spaced relation, a valve plate freely movably mounted in the space between said bodies, magnet means mounted on said magnet retainer body, said valve plate being constructed of material subject to attraction by the magnetic force of said magnet means, said magnet retainer body and valve plate being constructed to enable flow in the flow passage when the valve plate is held in engagement with a downstream end of said magnet retainer body by said magnet means when the flow pressure differential is below a predetermined limit with increase in pressure differential and corresponding increase in drag force exerted on the valve plate by flow past the valve plate overcoming the magnetic attraction and moving the valve plate into engagement with the valve seat on the upstream end of the valve seat body to preclude flow through the flow path.

13. The capsule as defined in claim 12 wherein said magnet retainer body includes a plurality of radially extending webs oriented in circumferentially spaced relation and including a central intersecting portion, said magnet means including a permanent magnet mounted on an upstream end of said intersecting portion of said webs to provide a gap between the magnet and the valve plate when the valve plate is engaged with the downstream end of the magnet retainer body.

14. The capsule as defined in claim 13 wherein said means interconnecting said bodies includes an axially extending peripheral skirt on said magnet retainer body telescopingly and sealingly engaged with said valve seat body to space the bodies apart and seal the valve seat body and magnetic retainer body in relation to the inner peripheral surface of the flow passage.

15. The capsule as defined in claim 14 wherein said radially extending webs forming the magnet retainer body includes axial projections extending from the upstream end of the webs, said magnet being insertable between said projections and retained in position by said projections, and a retainer ring movable axially over the projections outwardly of the magnet with the retainer ring including projecting means engaged with the inner peripheral surface of the flow passage for locking the capsule in the flow passage, said projections including tapered edge surfaces and laterally projecting shoulder surfaces to retain the magnet and retainer ring in position on the projections.

16. The capsule as defined in claim 15 wherein said valve seat includes a radial notch to enable restricted bypass flow to reduce pressure differential after the cause of increase in pressure differential has been corrected thereby enabling said magnet to move the valve plate away from the valve seat into engagement with the downstream end of said magnet retainer body.

17. The capsule as defined in claim 16 wherein said valve plate includes radial peripheral projections spaced circumferentially to maintain the valve plate in alignment with the valve seat when moved into engagement with the valve seat and provide a flow path around the periphery of the valve plate when the valve plate is positioned against the downstream end of the magnet retainer body by the magnetic force of said magnet.

* * * * *